United States Patent
Zhu et al.

(10) Patent No.: US 12,265,395 B2
(45) Date of Patent: Apr. 1, 2025

(54) AUTOMATIC WORKING SYSTEM, AUTOMATIC WALKING DEVICE, AND METHOD FOR CONTROLLING SAME, AND COMPUTER-READABLE STORAGE MEDIUM

(71) Applicant: Suzhou Cleva Precision Machinery & Technology Co., Ltd., Suzhou (CN)

(72) Inventors: Shaoming Zhu, Suzhou (CN); Xue Ren, Suzhou (CN); Lichao Yuan, Suzhou (CN)

(73) Assignee: Suzhou Cleva Precision Machinery & Technology Co., Ltd., Suzhou (CN)

( * ) Notice: Subject to any disclaimer, the term of this patent is extended or adjusted under 35 U.S.C. 154(b) by 109 days.

(21) Appl. No.: 17/768,028

(22) PCT Filed: Aug. 17, 2020

(86) PCT No.: PCT/CN2020/109479
§ 371 (c)(1),
(2) Date: Apr. 11, 2022

(87) PCT Pub. No.: WO2021/184665
PCT Pub. Date: Sep. 23, 2021

(65) Prior Publication Data
US 2024/0094739 A1    Mar. 21, 2024

(30) Foreign Application Priority Data
Mar. 19, 2020 (CN) .................. 202010198015.9

(51) Int. Cl.
*G05D 1/00* (2024.01)
*A01D 34/00* (2006.01)
(Continued)

(52) U.S. Cl.
CPC ......... *G05D 1/0246* (2013.01); *A01D 34/008* (2013.01); *G05D 1/0238* (2013.01);
(Continued)

(58) Field of Classification Search
CPC .. G05D 1/0246; G05D 1/0238; G05D 1/0255; A01D 34/008; A01D 2101/00;
(Continued)

(56) References Cited

U.S. PATENT DOCUMENTS

2001/0011405 A1   9/2001   Peless et al.
2011/0150348 A1   6/2011   Anderson

FOREIGN PATENT DOCUMENTS

CN   104111460 A   10/2014
CN   107463167 A   12/2017
(Continued)

OTHER PUBLICATIONS

English translation of CN-109588102-A (Year: 2019).*
International Search Report for Application No. PCT/CN2020/109479, dated Dec. 23, 2020.

*Primary Examiner* — Shon G Foley
(74) *Attorney, Agent, or Firm* — JK Intellectual Property Law, PA (57) ABSTRACT

A self-working system, a self-walking device (1) and a method for controlling same, and a computer-readable storage medium. The control method comprises: acquiring a captured image; processing the captured image to acquire a processed image; segmenting the processed image into at least one sub-region; calculating the size $A_n$ of each sub-region, respectively; counting the number of sub-regions with $A_n > V$ in the processed image, and marking same as the number $N_b$ of special sub-regions, wherein V is a preset quantity threshold; if $N_b \leq 1$, judging that the captured image belongs to a lawn region; and if $N_b > 1$, judging that the captured image belongs to a non-complete lawn region. If it is judged that a captured image belongs to a non-complete lawn region, it can be determined that there is a large obstacle or a boundary (2), etc. Whether the self-walking device (1) encounters an obstacle or a boundary (2) can be analyzed by analyzing a captured image, such that the operation is easier, and the control is more sensitive and effective.

19 Claims, 3 Drawing Sheets

(51) Int. Cl.
*G06T 7/11* (2017.01)
*A01D 101/00* (2006.01)

(52) U.S. Cl.
CPC .............. *G05D 1/0255* (2013.01); *G06T 7/11* (2017.01); *A01D 2101/00* (2013.01); *G06T 2207/20028* (2013.01); *G06T 2207/30261* (2013.01)

(58) Field of Classification Search
CPC ............ G06T 7/11; G06T 2207/20028; G06T 2207/30261; G06T 7/136
See application file for complete search history.

(56) References Cited

FOREIGN PATENT DOCUMENTS

| | | | | |
|---|---|---|---|---|
| CN | 107564071 A | | 1/2018 | |
| CN | 109584258 A | | 4/2019 | |
| CN | 109588102 A | * | 4/2019 | ........... A01D 34/008 |
| CN | 110399840 A | | 11/2019 | |

* cited by examiner

AUTOMATIC WORKING SYSTEM, AUTOMATIC WALKING DEVICE, AND METHOD FOR CONTROLLING SAME, AND COMPUTER-READABLE STORAGE MEDIUM

CROSS-REFERENCE TO RELATED PATENT APPLICATIONS

This application is a national stage of International Application No. PCT/CN2020/109479, filed on Aug. 17, 2020, which claims priority to CN patent application No. 202010198015.9, filed on Mar. 19, 2020. All of the aforementioned applications are hereby incorporated by reference in their entireties.

TECHNICAL FIELD

The disclosure relates to the field of intelligent control, in particular to a self-working system, a self-walking device, a control method therefor and a computer-readable storage medium.

BACKGROUND

With the continuous progress of computer technology and artificial intelligence technology, self-walking device and self-working system of intelligent robots have slowly entered people's lives, such as intelligent sweeping robots and intelligent mowing robots. Usually, this kind of intelligent robot is small in size, integrated with sensing means, driving means, batteries, etc., without manual control, and can travel and work in a specified region. In addition, when the battery power is insufficient, it can automatically return to the charging station, connect with the charging station and charge, and continue to travel and work after charging.

For the existing intelligent mower, the working region of the existing self-working system is a larger lawn, and the boundary is mostly an electrified device buried under the ground, so that the intelligent mower can sense it. However, if the boundary line is buried under the ground, it will cost more manpower and material resources. And burying the boundary line needs certain requirements, for example, the angle of the corner should not be less than 90 degrees etc., which limits the shape of the lawn for the intelligent mowing robot to a certain extent.

Therefore, it is necessary to design a more convenient self-working system that can be built on the ground, and the corresponding self-walking device, control method therefor and computer-readable storage medium.

SUMMARY

To solve one of the above problems, the disclosure provides a control method for a self-walking device, which comprises the following steps: acquiring a captured image; processing the captured image to acquire a processed image; segmenting the processed image into at least one sub-region; calculating the size $A_n$ of each sub-region, respectively; counting the number of sub-regions with $A_n>V$ in the processed image, and marking same as the number $N_b$ of special sub-regions, wherein V is a preset quantity threshold; if $N_b \leq 1$, judging that the captured image belongs to a lawn region; and if $N_b>1$, judging that the captured image belongs to a non-complete lawn region.

As a further improvement of the present disclosure, the step of "segmenting the processed image into at least one sub-region" specifically comprises: acquiring the pixel value P of each pixel point, presetting at least one pixel value range $P_n$, and respectively assembling the pixel points whose pixel value P belongs to the same pixel value range $P_n$ in the processed image into one sub-region.

As a further improvement of the present disclosure, the step of "acquiring a pixel value p for each pixel point" comprises: presetting coefficients a, b, c; acquiring R, G and B values of each pixel point respectively; calculating the pixel value p of each pixel point, $p=a*R+b*G+c*B$.

As a further improvement of the present disclosure, the step of "processing the captured image to acquire a processed image" comprises: carrying out bilateral filtering processing on the captured image to generate a filtered image; normalizing the filtered image to generate a normalized image; segmenting the normalized image to generate a segmented image; floodfill processing on the segmented image, and acquiring the filled image and marking same as the processed image.

As a further improvement of the disclosure, in the step of "carrying out image segmentation on the normalized image", the Pyramid Mean Shift algorithm is adopted for image segmentation.

As a further improvement of the present disclosure, the step of "calculating the size $A_n$ of each sub-region, respectively" comprises:
calculating the number $N_p$ of pixel points in each sub-region respectively;
the step of "counting the number of sub-regions with $A_n>V$ in the processed image, and marking same as the number $N_b$ of special sub-regions, wherein V is a preset quantity threshold" comprising:
counting the number of sub-regions in which $N_p$ is greater than $V_{num}$ in the processed image and marking same as the number $N_b$ of special sub-regions, wherein $V_{num}$ is a preset quantity threshold;
or,
the step of "calculating the size $A_n$ of each sub-region, respectively" comprises: respectively calculating the area $F_n$ of each sub-region;
the step of "counting the number of sub-regions with $A_n>V$ in the processed image, and marking same as the number $N_b$ of special sub-regions, wherein V is a preset quantity threshold" comprising:
counting the number of sub-regions in which $F_n$ is greater than $V_F$ in the processed image and marking same as the number $N_b$ of special sub-regions, wherein $V_F$ is a preset area threshold.

As a further improvement of the present disclosure, the step of "if $N_b \leq 1$, judging that the captured image belongs to a lawn region", is followed by:
carrying out ultrasonic detection of the distance $S_n$ between the sub-region with $A_n \leq V$ and the self-walking device;
counting the number of sub-regions with $S_n \leq V_S$ and marking same as the number of small obstacles $N_S$, wherein $V_S$ is the preset distance threshold;
if $N_S>0$, judging that there are small obstacles in the captured image;
if $N_S=0$, judging that there is no small obstacle in the captured image.

To solve one of the above problems, the disclosure provides a control method for a self-walking device, which comprises the following steps: acquiring a captured image; processing the captured image to acquire a processed image; segmenting the processed image into at least one sub-region; calculating the number N of sub-regions; if N=1, judging that the captured image belongs to a lawn region; if N>1, calculating the size $A_n$ of each sub-region, respectively; counting the number of sub-regions with $A_n>V$ in the processed image, and marking same as the number $N_b$ of special sub-regions, wherein V is a preset quantity threshold; if $N_b \leq 1$, judging that the captured image belongs to a lawn region; and if $N_b>1$, judging that the captured image belongs to a non-complete lawn region.

As a further improvement of the present disclosure, the step of "segmenting the processed image into at least one sub-region" specifically comprises: acquiring the pixel value P of each pixel point, presetting at least one pixel value range $P_n$, and respectively assembling the pixel points whose pixel value P belongs to the same pixel value range $P_n$ in the processed image into one sub-region.

As a further improvement of the present disclosure, the step of "acquiring a pixel value p for each pixel point" comprises: presetting coefficients a, b, c; acquiring R, G and B values of each pixel point respectively; calculating the pixel value p of each pixel point, $p=a*R+b*G+c*B$.

As a further improvement of the present disclosure, the step of "processing the captured image to acquire a processed image" comprises: carrying out bilateral filtering processing on the captured image to generate a filtered image; normalizing the filtered image to generate a normalized image; segmenting the normalized image to generate a segmented image; floodfill processing on the segmented image, and acquiring the filled image and marking same as the processed image.

As a further improvement of the disclosure, in the step of "carrying out image segmentation on the normalized image", the Pyramid Mean Shift algorithm is adopted for image segmentation.

As a further improvement of the present disclosure, the step of "calculating the size $A_n$ of each sub-region, respectively" comprises:

calculating the number $N_p$ of pixel points in each sub-region respectively;

the step of "counting the number of sub-regions with $A_n>V$ in the processed image, and marking same as the number $N_b$ of special sub-regions, wherein V is a preset quantity threshold" comprising:

counting the number of sub-regions in which $N_p$ is greater than $V_{num}$ in the processed image and marking same as the number $N_b$ of special sub-regions, wherein $V_{num}$ is a preset quantity threshold;

or, the step of "calculating the size $A_n$ of each sub-region, respectively" comprises: respectively calculating the area $F_n$ of each sub-region;

the step of "counting the number of sub-regions with $A_n>V$ in the processed image, and marking same as the number $N_b$ of special sub-regions, wherein V is a preset quantity threshold" comprising:

counting the number of sub-regions in which $F_n$ is greater than $V_F$ in the processed image and marking same as the number $N_b$ of special sub-regions, wherein $V_F$ is a preset area threshold.

As a further improvement of the present disclosure, the step of "if $N_b \leq 1$, judging that the captured image belongs to a lawn region" is followed by:

carrying out ultrasonic detection of the distance $S_n$ between the sub-region with $A_n \leq V$ and the self-walking device;

counting the number of sub-regions with $S_n \leq V_S$ and marking same as the number of small obstacles $N_S$, wherein $V_S$ is the preset distance threshold;

if $N_S>0$, judging that there are small obstacles in the captured image;

if $N_S=0$, judging that there is no small obstacle in the captured image.

In order to solve one of the above problems, the disclosure also provides a self-working system, which comprises: a self-walking device, operable according to the above control methods; the boundary, arranged in an annular shape and forming a working region for defining the self-walking device, and extending upward from the ground.

In order to solve one of the above problems, the disclosure also provides a self-working system, which comprises: a self-walking device, operable according to the above control methods; a working region, provided with a non-working region along the outer side of the edge of the working region, and the working region and the non-working region having different geology and forming a boundary.

To solve one of the above problems, the disclosure also provides a self-walking device, which comprises a main body, a walking module, a power supply module, a memory and a processor arranged in the main body, the memory storing a computer program that can be run on the processor, and wherein the self-walking device further comprises a camera arranged in the main body, and the shooting direction of the camera facing the front side of the self-walking device along the traveling direction; when the processor executes the computer program, the steps of the control method for the self-walking device as described above are implement.

As a further improvement of the disclosure, the self-walking device further comprises an ultrasonic detector mounted in the main body.

In order to solve one of the above problems, the disclosure also provides a computer-readable storage medium, having a computer program stored thereon, when computer program is executed by a processor, the steps of the control method for a self-walking device as described above are implemented.

Compared with the prior art, in the present disclosure, the captured image taken by the self-walking device may be processed and analyzed, and the processed image may be segmented to acquire at least one sub-region, if a certain sub-region is larger, it may be judged as a special sub-region; if more than one special sub-region is set, it may be judged that the captured image belongs to an non-complete lawn region, and it may be determined that there are large obstacles or boundaries etc. in the captured image, so that self-walking device is required to carry out operations such as retreating and turning to avoid; if the number of the special sub-regions does not exceed one, it may be determined that the captured image is completely a lawn region, even if there are some obstacles such as fallen leaves, small stones, etc. Therefore, by analyzing the captured image, it may be analyzed whether the automatic walking encounters boundaries or obstacles, the operation is easier, and the control is more sensitive and effective

DETAILED DESCRIPTION

In order for those skilled in the art to have a better understanding of the technical aspects of the present disclosure, a clear and complete description of the technical aspects of the embodiments of the present disclosure will be given below in conjunction with the accompanying drawings in the embodiments of the present disclosure, and it will be apparent that the described embodiments are only part of the embodiments of the present disclosure, not all of them. On the basis of the embodiments in the present disclosure, all other embodiments obtained by those skilled in the art without making creative efforts should fall within the scope of protection of the present disclosure.

In each figure of the present application, certain dimensions of the structure or portion may be exaggerated with respect to other structures or portions for ease of illustration, and therefore are only used to illustrate the basic structure of the subject matter of the present application.

The self-walking device of the present disclosure may be an automatic lawn mower, an automatic vacuum cleaner and the like, which may automatically walk in a working region to carry out mowing and vacuuming work. In the specific embodiments of the disclosure, the self-walking device is taken as a lawn mower for specific description, and correspondingly, the working region may be a lawn. Of course, self-walking device is not limited to lawn mowers and vacuum cleaners, but may also be unattended device suitable for other device, such as spraying device, snow removal device, monitoring device, etc.

Figure 1:
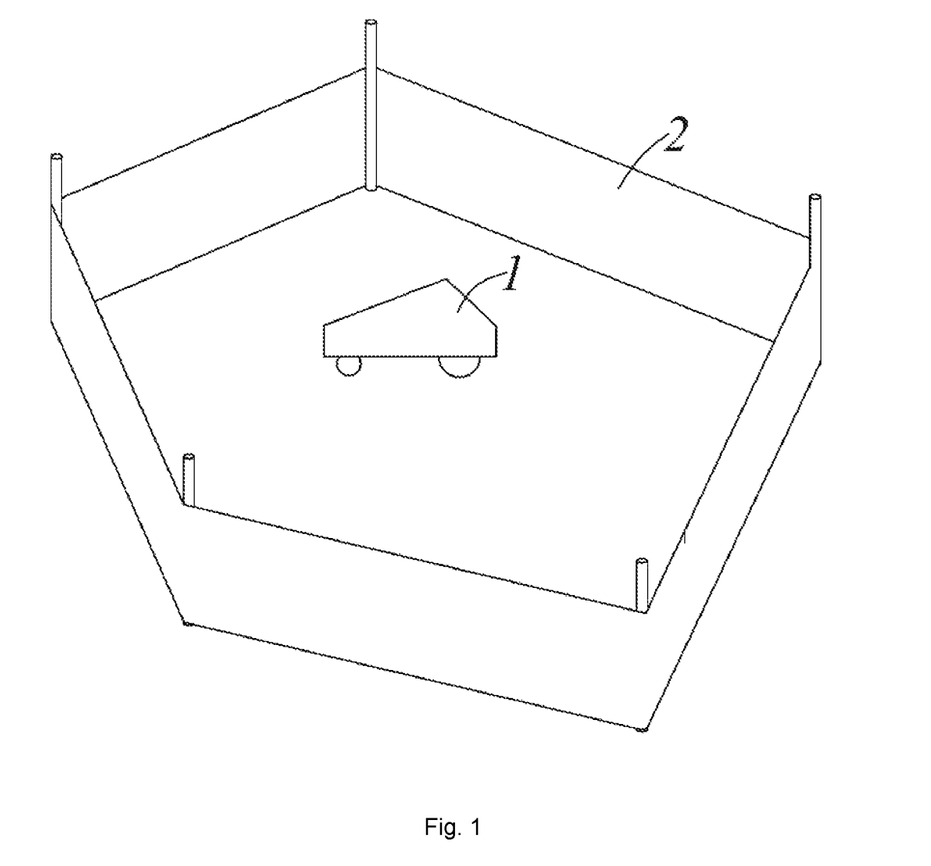
FIG. 1 is a structural schematic diagram of the self-working system of the present disclosure.
Figure 2:
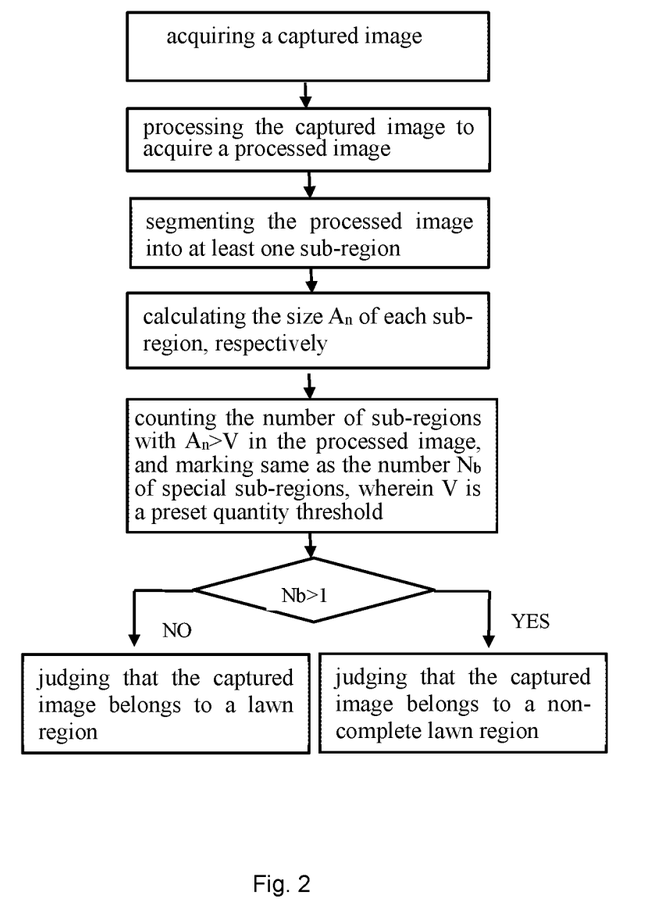
FIG. 2 is a flow chat of the first embodiment of the present disclosure.

As shown in FIGS. 1 and 2, in a first embodiment of the present disclosure, a control method for a self-walking device 1 is provided, which comprises:

acquiring a captured image;

processing the captured image to acquire a processed image;

segmenting the processed image into at least one sub-region;

calculating the size $A_n$ of each sub-region, respectively;

counting the number of sub-regions with $A_n>V$ in the processed image, and marking same as the number $N_b$ of special sub-regions, wherein V is a preset quantity threshold;

if $N_b \leq 1$, judging that the captured image belongs to a lawn region;

if $N_b>1$, judging that the captured image belongs to a non-complete lawn region.

Therefore, in the present disclosure, the captured image captured by the self-walking device 1 may be processed and analyzed, and at least one sub-region may be acquired by segmenting the processed image. If a certain sub-region is larger, it may be judged as a special sub-region; if more than one special sub-region is set, it may be judged that the captured image belongs to an non-complete lawn region, and it may be determined that there are large obstacles or boundaries 2 in the captured image, so that the self-walking device 1 needs to carry out operations such as retreating and turning to avoid; if the number of the special sub-regions does not exceed one, it may be determined that the captured image is completely a lawn region, even if there are some obstacles such as fallen leaves, small stones, etc. Therefore, by analyzing the captured image, it may be analyzed whether the automatic walking encounters the boundary 2 or an obstacle, which is more convenient and makes the control more sensitive and effective.

The step of "segmenting the processed image into at least one sub-region" specifically comprises: acquiring the pixel value p of each pixel point, presetting at least one pixel value range $P_n$, and respectively assembling the pixel points whose pixel value P belongs to the same pixel value range $P_n$ in the processed image into one sub-region. In the present disclosure, the sub-regions are segmented according to the pixel value p. "assembling the pixel points whose pixel value P belongs to the same pixel value range $P_n$ in the processed image into one sub-region" is that, the pixel points with similar or the same color in the processed image are assembled into a sub-region. Therefore, the pixel value range $P_n$ may be a pixel value interval, and of course it may also refer to specific pixel values.

Further, the step of "acquiring a pixel value p for each pixel point" comprises:

presetting coefficients a, b, c;

acquiring R, G and B values of each pixel point respectively;

calculating the pixel value p of each pixel point, $p=a*R+b*G+c*B$.

In the present disclosure, a processed image is acquired after processing and analyzing the captured image, and then the calculation of the pixel value of the pixel point and the segment of the sub-region are carried out in the processing image. Moreover, the coefficients a, b and c may be judged by the color of lawn. Wherein, it is obvious that by processing the captured image, the processed image obtained comprises at least one sub-region, and the pixel values of the pixels within each sub-region are the same.

The present disclosure provides a specific embodiment, which may process a captured image to form a processed image as described above. Specifically, the step of "processing the captured image to acquire a processed image" comprises:

carrying out bilateral filtering processing on the captured image to generate a filtered image;

normalizing the filtered image to generate a normalized image;

segmenting the normalized image to generate a segmented image;

floodfill processing on the segmented image, and acquiring a filled image and marking same as the processed image.

The bilateral filtering processing is a nonlinear filtering method, which is a compromise processing combining the spatial proximity of images with the similarity of pixel values, and considers the spatial information and gray similarity simultaneously, so as to achieve the purpose of edge-preserving denoising. It is simple, non-iterative and local.

The normalizing refers to the process of transforming an image into a fixed standard form by a series of standard processing and transforming.

The image segmentation is a crucial pretreatment in image recognition and computer vision. Image segmentation is on the basis of the brightness and color of pixels in the image, and artificial intelligence is introduced to correct the errors caused by uneven illumination, shadow, unclear image or noise and the like in segmentation. By image segmentation, the image may be roughly processed into an image composed of several different regional color blocks. In the present disclosure, the normalized image is thus converted into an image similar to the processed image. Moreover, image segmentation may adopt many ways, such as threshold-based segmentation method, region-based segmentation method, edge-based segmentation method and specific theory-based segmentation method and the like. In the present disclosure, in the specific step of "segmenting the normalized image", the Pyramid Mean Shift algorithm is adopted for image segmentation.

Further, since the self-walking device 1 in the present disclosure usually walks on the grass, it is sufficient to identify large obstacles or boundaries 2, and the grass. Therefore, in order to make the final processed image easier to analyze, floodfill processing is also carry out on the segmented image in the present disclosure. The floodfill processing is to fill the connected regions by color, and to achieve the purpose of floodfill by setting the upper and lower limits of connected pixels, and to connect similar pixel regions into a whole.

Therefore, by the above method, the captured image may be processed to form a processed image for subsequent analysis.

Further, in the present disclosure, two specific embodiments are provided for judging the size $A_n$ of the sub-region.

In the first embodiment, the step of "calculating the size $A_n$ of each sub-region, respectively" comprises:
calculating the number $N_p$ of pixel points in each sub-region respectively,
the step of "counting the number of sub-regions with $A_n>V$ in the processed image, and marking same as the number $N_b$ of special sub-regions, wherein V is a preset threshold" comprising:
counting the number of sub-regions in which $N_p$ is greater than $V_{num}$ in the processed image and marking same as the number $N_b$ of special sub-regions, wherein $V_{num}$ is a preset quantity threshold.

In this embodiment, a quantity threshold $V_{num}$ is required to be preset first, and the quantity threshold $V_{num}$ is compared with the number $N_p$ of pixel points in the sub-region. If the number $N_p$ of pixel points in the sub-region exceeds the quantity threshold $V_{num}$, it may be indicated that the number of pixel points in the sub-region is larger, and it may be judged that the sub-region occupies a larger area in the processed image; if the number $N_p$ of pixel points in the sub-region is less than the quantity threshold $V_{num}$, it may be indicated that the number of pixel points in the sub-region is smaller, and it may be judged that the sub-region occupies a smaller area in the processed image. Thus, if the number of sub-regions occupying a larger area in the processed image is one, it is obvious that the sub-region is a grass, and if the number of sub-regions occupying a larger area in the processed image is at least two, it is obvious that one of the sub-regions is a large obstacle or boundary 2.

Alternatively, in another embodiment, the step of "calculating the size $A_n$ of each sub-region, respectively" comprises:
respectively calculating the area $F_n$ of each sub-region;
the step of "counting the number of sub-regions with $A_n>V$ in the processed image, and marking same as the number $N_b$ of special sub-regions, wherein V is a preset threshold" comprising:
counting the number of sub-regions in which $F_n$ is greater than $V_F$ in the processed image and marking same as the number $N_b$ of special sub-regions, wherein $V_F$ is a preset area threshold.

Similarly, in the present embodiment, the area threshold $V_F$ needs to be preset first, and the area threshold $V_F$ is compared with the area $F_n$ in the sub-region. If the area $F_n$ of the sub-region exceeds the area threshold $V_F$, it may be indicated that the sub-region occupies a larger area in the processed image. Thus, if the number of sub-regions occupying a larger area in the processed image is one, it is obvious that the sub-region is a grass, and if the number of sub-regions occupying a larger area in the processed image is at least two, it is obvious that one of the sub-regions is a large obstacle or boundary 2.

Of course the quantity threshold value $V_{num}$ and the area threshold value $V_F$ are related to the size of the captured image, and the larger the size of the captured image, the larger the values of the quantity threshold value $V_{num}$ and the area threshold value $V_F$. For example, in a specific embodiment, the number of pixel points $N_{p1}$ in one sub-region is 8284, the number of pixel points $N_{p2}$ in the other sub-region is 10658, and the quantity threshold $V_{num}$ is set to 250, then the non-complete lawn may be judged.

In addition, the step of "if $N_b \leq 1$, judging that the captured image belongs to a lawn region" is followed by:
carrying out ultrasonic detection of the distance $S_n$ between the sub-region with $A_n \leq V$ and the self-walking device;
counting the number of sub-regions with $S_n \leq V_S$ and marking same as the number of small obstacles $N_S$, wherein $V_S$ is the preset distance threshold;
if $N_S>0$, judging that there are small obstacles in the captured image;
if $N_S=0$, judging that there is no small obstacle in the captured image.

In the present disclosure, if the size of the sub-region with $A_n \leq V$, it may be indicated that the sub-region may be obstacles such as small stones, shadows, bare soil, leaves and the like on the lawn that will not affect the travel of the self-walking device, and these obstacles are not actual obstacles. Therefore, ultrasonic detectors are also arranged in the self-walking device, and the distance between these sub-regions and the self-walking device is detected by the ultrasonic detectors. If the distance is large and exceeds the preset distance threshold $V_S$, it may be indicated that the sub-regions cannot cause actual obstacles; if the distance is small and not greater than the preset distance threshold $V_S$, it may be indicated that there are small obstacles in the sub-region, such as high stones, which will affect the travel of self-walking device.

Figure 3:
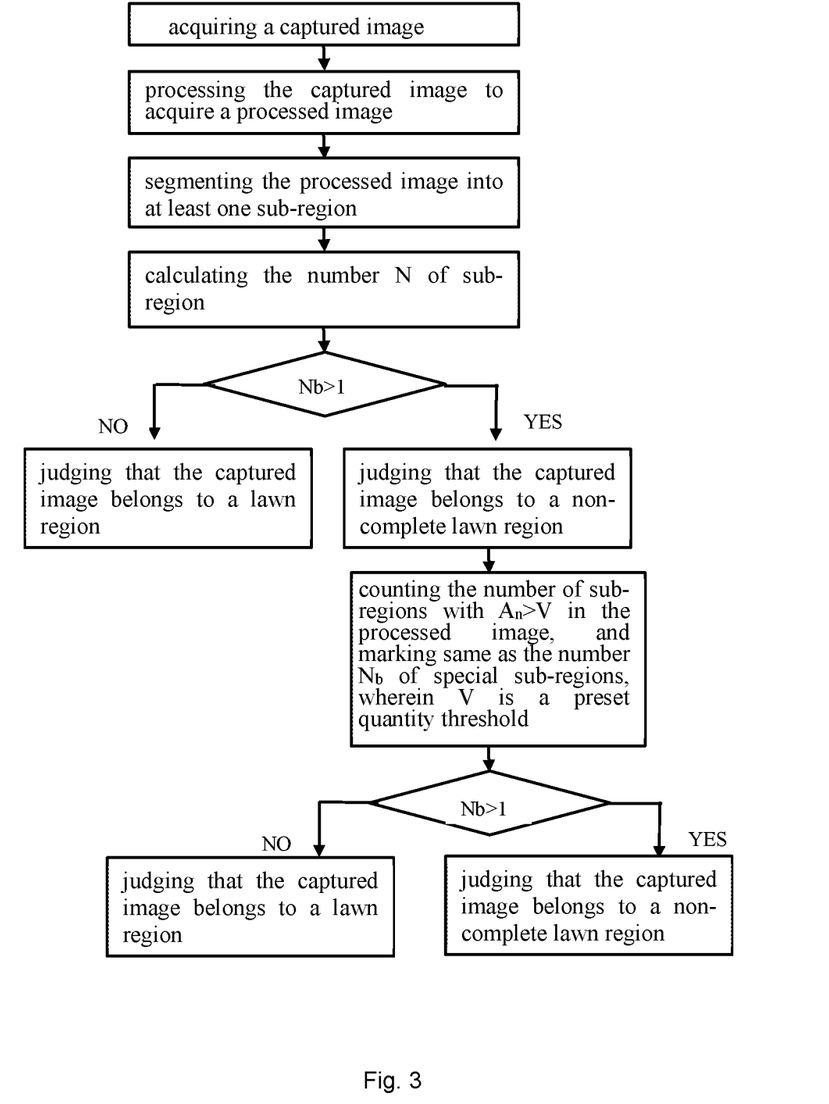
FIG. 3 is a flow chat of the second embodiment of the present disclosure.

As shown in FIGS. 1 and 3, in a second embodiment of the present disclosure, another control method for a self-walking device 1 is provided, which comprises:
acquiring a captured image;
processing the captured image to acquire a processed image;
segmenting the processed image into at least one sub-region;
calculating the number N of sub-regions;
if N=1, judging that the captured image belongs to a lawn region;
if N>1, calculating the size $A_n$ of each sub-region, respectively, counting the number of sub-regions with $A_n>V$ in the processed image, and marking same as the number $N_b$ of special sub-regions, wherein V is a preset quantity threshold; if $N_b \leq 1$, judging that the captured image belongs to a lawn region; and if $N_b>1$, judging that the captured image belongs to a non-complete lawn region.

Different from the above-mentioned first embodiment, the number of sub-regions is judged after the processing image is analyzed to acquire a plurality of sub-regions. If the number of sub-regions is only one, it is directly judged that the captured image belongs to the lawn region, and no other analysis is carried out; if the number of sub-regions is judged to be more than one, the number $N_b$ of special sub-regions is further judged.

Further, the step of "segmenting the processed image into at least one sub-region" specifically comprises: acquiring the pixel value P of each pixel point, presetting at least one pixel value range $P_n$, and respectively assembling the pixel points whose pixel value P belongs to the same pixel value range $P_n$ in the processed image into one sub-region. Similarly, "assembling the pixel points whose pixel value p belongs to the same pixel value range $P_n$ into a sub-region" is that, the pixel points with similar or the same color in the processed image are assembled into a sub-region. Therefore, the pixel value range $P_n$ may be a pixel value interval, and of course it may also refer to specific pixel values.

The step of "acquiring a pixel value p for each pixel point" comprises:
  presetting coefficients a, b, c;
  acquiring R, G and B values of each pixel point respectively;
  calculating the pixel value p of each pixel point, p=a*R+b*G+c*B.

The step of "processing the captured image to acquire a processed image" comprises:
  carrying out bilateral filtering processing on the captured image to generate a filtered image;
  normalizing the filtered image to generate a normalized image;
  segmenting the normalized image to generate a segmented image;
  floodfill processing on the segmented image, and acquiring a filled image and marking same as the processed image.

In the step of "carrying out image segmentation on the standard mode image", the Pyramid Mean Shift algorithm is adopted for image segmentation.

The step of "calculating the size $A_n$ of each sub-region, respectively" comprises:
  calculating the number $N_p$ of pixel points in each sub-region respectively;
  the step of "counting the number of sub-regions with $A_n>V$ in the processed image, and marking same as the number $N_b$ of special sub-regions, wherein V is a preset threshold" comprising:
  counting the number of sub-regions in which $N_p$ is greater than $V_{num}$ in the processed image and marking same as the number $N_b$ of special sub-regions, wherein $V_{num}$ is a preset number threshold;
  or,
  the step of "calculating the size $A_n$ of each sub-region, respectively" comprises: respectively calculating the area $F_n$ of each sub-region;
  the step of "counting the number of sub-regions with $A_n>V$ in the processed image, and marking same as the number $N_b$ of special sub-regions, wherein V is a preset threshold" comprising:
  counting the number of sub-regions in which $F_n$ is greater than $V_F$ in the processed image and marking same as the number of special sub-regions $N_b$, wherein $V_F$ is a preset area threshold.

In addition, the step of "if $N_b \leq 1$, judging that the captured image belongs to a lawn region" is followed by:
  carrying out ultrasonic detection of the distance $S_n$ between the sub-region $A_n \leq V$ and the self-walking device;
  counting the number of sub-regions with $S_n \leq V_S$ and marking same as the number of small obstacles $N_S$, wherein $V_S$ is the preset distance threshold;
  if $N_S>0$, judging that there are small obstacles in the captured image;
  if $N_S=0$, judging that there is no small obstacle in the captured image.

All of the above are the same as those in the first embodiment and will not be described here again.

The disclosure also provides a self-working system, which comprises:
  a self-walking device 1 operable according to the control method as described above;
  a boundary 2 arranged in an annual shape and forming a work region for defining the self-walking device 1, the boundary 2 extending upward from the ground.

In the present disclosure, the self-walking device 1 acquires the traveling region of the self-walking device 1 by acquiring a captured image, and then processing and analyzing the captured image, so that the boundary 2 of the self-working system in the present disclosure has to extend upward from the ground, so that it may be captured and recognized by the self-walking device 1.

In addition, the disclosure also provides a self-working system, which comprises:
  a self-walking device 1 operable according to the control method as described above;
  a working region provided with a non-working region along the outer side of the edge of the working region, and the working region and the non-working region having different geology and forming a boundary 2.

Since the self-walking device 1 in the present disclosure is used in a lawn mower, the lawn is the working region, and obviously, the non-working region may be bare soil, floor, concrete board, etc., the geology of which is quite different from that of the lawn, and the color of which is also quite different from that of the lawn. Thus, a boundary 2 is naturally formed between the working region and the non-working region due to obvious geological differences, and the boundary 2 is not artificially set but naturally formed. However, the control method of the present disclosure may also be applied due to the obvious color difference between the working region and the non-working region and the formation of the boundary 2.

The disclosure also provides a self-walking device 1, which comprises a main body, a walking module, a power supply module, a memory and a processor arranged in the main body, the memory storing a computer program that can be run on the processor, and the self-walking device 1 further comprises a camera arranged in the main body, and the shooting direction of the camera facing the front side of the self-walking device 1 along the traveling direction; when the processor executes the computer program, the steps of the control method for the self-walking device 1 as described above can by performed. That is, when the processor executes the computer program, the steps of the control method of any of the embodiments of the Automatic Walking Apparatus 1 described above can be performed.

As described above, the main body of the self-walking device 1 in the present disclosure is provided with a camera, so that a captured image may be captured and acquired. Furthermore, the shooting direction of the camera faces the front side of the self-walking device 1 in the traveling direction, so that the camera captures a scene on the front side of the self-walking device 1. Thus, the next movement track of the self-walking device 1 may be analyzed on the basis of the captured image acquired by the self-walking device 1. If it is judged that the captured image belongs to the lawn region, the self-walking device 1 is controlled to further walk and work; if it is judged that the captured image belongs to a non-complete lawn region the automatic, walking device 1 is controlled to perform operations such as stopping, turning or retreating and the like.

The self-walking device 1 further comprises an ultrasonic detector which is mounted in the main body. The ultrasonic detector is used for detecting the distance $S_n$ between a sub-region with a smaller sub-region size $A_n$ and the self-walking device 1. If it is judged that there is a small obstacle in the captured image, when the small obstacle is reached, the self-walking device 1 is controlled to perform an operation such as stopping, turning or retreating and the like; if it is judged that there is no small obstacle in the captured image, the self-walking device 1 can be controlled to travel freely.

Likewise, the present disclosure also provides a computer-readable storage medium storing a computer program thereon, when the computer program is executed by a processor, the steps in the control method for the self-walking device 1 as described above are implemented. That is, when the processor executes the computer program, the steps of the control method of any of the embodiments of the self-walking device 1 described above are implemented.

In summary, the present disclosure provides a self-working system, a self-walking device 1, a control method therefor, and a computer-readable storage medium. In the control method for the self-walking device 1, it is judged whether a captured image belongs to a lawn region or a non-complete lawn region by two embodiments. Therefore, by analyzing the captured image, it is possible to analyze whether the automatic walking encounters the boundary 2 or an obstacle, which is more convenient and makes the control more sensitive and effective. Further, the present disclosure also provides a specific embodiment for processing the captured image, which is mainly by bilateral filtering processing, normalizing processing, image segmentation and floodfill processing on the captured image, so as to process the processed image to comprise at least one sub-region, and the pixel values of pixels in each sub-region are the same or approximate. In particular, the Pyramid Mean Shift algorithm is adopted for image segmentation, so that the processing result of the captured image may better meet the purpose of the present disclosure.

In addition, it should be understood that, while this specification is described in accordance with embodiments, each embodiment does not contain only an independent technical solution, and the description is described for clarity only. Those skilled in the art should take the description as a whole, and the technical solutions in each embodiment may be suitably combined to form other embodiments that can be understood by those skilled in the art.

The series of detailed descriptions set forth above are intended to be specific to feasible embodiments of the present disclosure only and are not intended to limit the scope of protection of the present disclosure, and any equivalent embodiments or modifications made without departing from the technical spirit of the present disclosure should be comprised within the scope of protection of the present disclosure.

The invention claimed is:

1. A control method for a self-walking device, comprising:
  acquiring a captured image;
  processing the captured image to acquire a processed image;
  segmenting the processed image into at least one sub-region;
  calculating the size $A_n$ of each sub-region, respectively;
  counting the number of sub-regions with $A_n>V$ in the processed image, and marking same as the number $N_b$ of special sub-regions, wherein V is a preset quantity threshold;
  if $N_b \leq 1$, judging that the captured image belongs to a lawn region; and
  if $N_b>1$, judging that the captured image belongs to a non-complete lawn region,
  whereby, based on the "judging" steps, the self-walking device operates within the lawn region and not within the non-complete lawn region.

2. The control method according to claim 1, wherein the step of "segmenting the processed image into at least one sub-region" includes acquiring the pixel value P of each pixel point, presetting at least one pixel value range Pn, and respectively assembling the pixel points whose pixel value P belongs to the same pixel value range Pn in the processed image into one sub-region.

3. The control method according to claim 2, wherein the step of "acquiring a pixel value p for each pixel point" includes:
  presetting coefficients a, b, c;
  acquiring R, G and B values of each pixel point respectively; and
  calculating the pixel value p of each pixel point, $p=a*R+b*G+c*B$.

4. The control method according to claim 1, wherein the step of "processing the captured image to acquire a processed image" includes:
  carrying out bilateral filtering processing on the captured image to generate a filtered image;
  normalizing the filtered image to generate a normalized image;
  segmenting the normalized image to generate a segmented image; and
  floodfill processing on the segmented image, and acquiring the filled image and marking same as the processed image.

5. The control method according to claim 4, wherein in the step of "segmenting the normalized image", the Pyramid Mean Shift algorithm is adopted for image segmentation.

6. The control method according to claim 1, wherein the step of "calculating the size $A_n$ of each sub-region, respectively" includes calculating the number $N_p$ of pixel points in each sub-region respectively; and
  wherein the step of "counting the number of sub-regions with $A_n>V$ in the processed image, and marking same as the number $N_b$ of special sub-regions, wherein V is a preset threshold" includes counting the number of sub-regions in which $N_p$ is greater than $V_{num}$ in the processed image and marking same as the number $N_b$ of special sub-regions, wherein $V_{num}$ is a preset quantity threshold;
  or,
  wherein the step of "calculating the size $A_n$ of each sub-region, respectively" includes respectively calculating the area $F_n$ of each sub-region; and
  wherein the step of "counting the number of sub-regions with $A_n>V$ in the processed image, and marking same as the number $N_b$ of special sub-regions, wherein V is a preset threshold" includes counting the number of sub-regions in which $F_n$ is greater than $V_F$ in the processed image and marking same as the number $N_b$ of special sub-regions, wherein $V_F$ is a preset area threshold.

7. The control method according to claim 1, wherein the step of "if $N_b \leq 1$, judging that the captured image belongs to a lawn region" is followed by:
   carrying out ultrasonic detection of the distance Sn between the sub-region with $A_n \leq V$ and the self-walking device;
   counting the number of sub-regions with $S_n \leq V_S$ and marking same as the number of small obstacles $N_S$, wherein $V_S$ is the preset distance threshold;
   if $N_S > 0$, judging that there are small obstacles in the captured image; and
   if $N_S = 0$, judging that there is no small obstacle in the captured image.

8. An automated working system, comprising:
   a self-walking device operable according to the control method of claim 1 within a boundary, the boundary being arranged in an annular shape and forming a working region for the self-walking device, and extending upward from the ground.

9. An automated working system, comprising:
   a self-walking device operable according to the control method according to claim 1 within a working region, the working region being provided with a non-working region along an outer side of an edge of the working region, and the working region and the non-working region having different geology and forming a boundary.

10. A self-walking device, comprising a main body, a walking module, a power supply module, a memory and a processor arranged in the main body, the memory storing a computer program that can be run on the processor, and wherein the self-walking device further includes a camera arranged in the main body, and the shooting direction of the camera facing the front side of the self-walking device along the traveling direction; and
    wherein, when the processor executes the computer program, the control method for the self-walking device according to claim 1 is implemented.

11. The self-walking device according to claim 10, wherein the self-walking device further includes an ultrasonic detector mounted in the main body.

12. A computer-readable storage medium, having a non-transitory computer program stored thereon, wherein, when the computer program is executed by a processor, the control method for a self-walking device according to claim 1 is implemented.

13. A control method for a self-walking device, comprising:
    acquiring a captured image;
    processing the captured image to acquire a processed image;
    segmenting the processed image into at least one sub-region;
    calculating the number N of sub-regions;
    if N=1, judging that the captured image belongs to a lawn region;
    if N>1, calculating the size $A_n$ of each sub-region, respectively;
    counting the number of sub-regions with $A_n > V$ in the processed image, and marking same as the number $N_b$ of special sub-regions, wherein V is a preset quantity threshold;
    if $N_b \leq 1$, judging that the captured image belongs to a lawn region; and
    if $N_b > 1$, judging that the captured image belongs to a non-complete lawn region,
    whereby, based on the "judging" steps, the self-walking device operates within the lawn region and not within the non-complete lawn region.

14. The control method according to claim 13, wherein the step of "segmenting the processed image into at least one sub-region" includes acquiring the pixel value P of each pixel point, presetting at least one pixel value range $P_n$, and respectively assembling the pixel points whose pixel value P belongs to the same pixel value range $P_n$ in the processed image into one sub-region.

15. The control method according to claim 14, wherein the step of "acquiring a pixel value p for each pixel point" includes:
    presetting coefficients a, b, c;
    acquiring R, G and B values of each pixel point respectively; and
    calculating the pixel value p of each pixel point, p=a*R+b*G+c*B.

16. The control method according to claim 13, wherein the step of "processing the captured image to acquire a processed image" includes:
    carrying out bilateral filtering processing on the captured image to generate a filtered image;
    normalizing the filtered image to generate a normalized image;
    segmenting the normalized image to generate a segmented image; and
    floodfill processing on the segmented image, and acquiring the filled image and marking same as the processed image.

17. The control method according to claim 16, wherein the step of "carrying out image segmentation on the normalized image", the Pyramid Mean Shift algorithm is adopted for image segmentation.

18. The control method according to claim 13, wherein the step of "calculating the size $A_n$ of each sub-region, respectively" includes calculating the number $N_p$ of pixel points in each sub-region respectively;
    wherein the step of "counting the number of sub-regions with $A_n > V$ in the processed image, and marking same as the number $N_b$ of special sub-regions, wherein V is a preset threshold" includes counting the number of sub-regions in which $N_p$ is greater than $V_{num}$ in the processed image and marking same as the number $N_b$ of special sub-regions, wherein $V_{num}$ is a preset quantity threshold;
    or,
    wherein the step of "calculating the size $A_n$ of each sub-region, respectively" includes respectively calculating the area $F_n$ of each sub-region; and
    wherein the step of "counting the number of sub-regions with $A_n > V$ in the processed image, and marking same as the number $N_b$ of special sub-regions, wherein V is a preset threshold" includes counting the number of sub-regions in which $F_n$ is greater than $V_F$ in the processed image and marking same as the number $N_b$ of special sub-regions, wherein $V_F$ is a preset area threshold.

19. The control method according to claim 13, wherein the step of "if $N_b \leq 1$, judging that the captured image belongs to a lawn region" is followed by:
    carrying out ultrasonic detection of the distance $S_n$ between the sub-region with $A_n \leq V$ and the self-walking device;

counting the number of sub-regions with $S_n \leq V_S$ and marking same as the number of small obstacles $N_S$, wherein $V_S$ is the preset distance threshold;

if $N_S > 0$, judging that there are small obstacles in the captured image; and if $N_S = 0$, judging that there is no small obstacle in the captured image.

* * * * *